United States Patent [19]

Takahashi et al.

[11] Patent Number: 4,617,078

[45] Date of Patent: Oct. 14, 1986

[54] METHOD FOR SURFACE PRIMING IN ADHESIVE BONDING

[75] Inventors: Masaharu Takahashi, Gunma; Yuji Tokushige, Tokyo; Kunio Itoh, Gunma, all of Japan

[73] Assignee: Shin-Etsu Chemical Co., Ltd., Tokyo, Japan

[21] Appl. No.: 697,792

[22] Filed: Feb. 4, 1985

[30] Foreign Application Priority Data

Feb. 6, 1984 [JP] Japan .................................. 59-19774

[51] Int. Cl.$^4$ .............................................. C09J 5/02
[52] U.S. Cl. .................................. 156/307.5; 156/329; 427/407.1; 428/448; 528/28
[58] Field of Search .............................. 156/307.5, 329; 428/448; 427/407.1; 528/28

[56] References Cited

U.S. PATENT DOCUMENTS 3,143,514  8/1964  Boyer ..................................... 528/28
3,519,516  7/1970  Zhinkin et al. ........................ 156/329

Primary Examiner—John J. Gallagher
Attorney, Agent, or Firm—Toren, McGeady, Stanger, Goldberg & Kiel

[57] ABSTRACT

The invention provides a novel method for surface priming when adhesive bonding is desired between a rubber, e.g. silicone rubber, and a substrate of a material such as a metal or plastic resin. The inventive method is performed by use of a primer composition of which the principal ingredient is an organosilicon polymer hitherto not used for such a purpose. The organosilicon polymer is represented by the average unit formula $R_aSiX_{4-a}$, in which R is a monovalent hydrocarbon group, X is a divalent atom or group selected from the class consisting of an oxygen atom, an imino group, alkylene groups and a phenylene group and a is a positive number of 0.2 to 1.8, at least one of the hydrocarbon groups denoted by R in a molecule being aliphatically unsaturated and at least 10% by moles of the groups denoted by X in a molecule being the imino groups. This primer composition has good workability and gives adhesive bonding capable of withstanding a prolonged heat treatment in a dry condition or by dipping in a hot oil such as a silicone fluid.

2 Claims, No Drawings

METHOD FOR SURFACE PRIMING IN ADHESIVE BONDING

BACKGROUND OF THE INVENTION

The present invention relates to a method for surface priming in adhesive bonding or, more particularly, to a method for surface priming in adhesively bonding a metal and a silicone rubber by use of an organosilicon compound as a priming material.

As is well known, silicone rubbers are widely used in a variety of applications by virtue of their inherently excellent physical and chemical properties and it is not rare that silicone rubbers are used as a part of a composite body with other parts of a metal or plastic resin by adhesively bonding together. One of the problems in the preparation of such a composite body is the poor adhesive bonding strength between a silicone rubber and a metal or plastic resin. Therefore, it is a usually undertaken method that the adhesive bonding of a silicone rubber composition to the surface of a metallic or plastic part is preceded by coating the surface with a primer composition composed of an alkoxysilane compound having an aliphatically unsaturated linkage in the molecule such as vinyl trimethoxysilane, vinyl tri(2-methoxyethoxy)silane, 3-methacryloxypropyl trimethoxysilane and the like or a hydrolysis condensation product or cohydrolysis polysiloxane thereof, a titanate ester and a metal salt of a carboxylic acid. The priming effect obtained by use of the above described primer composition is, however, not strong enough so that the adhesive bonding strength cannot be prolongedly maintained when the adhesively bonded composite body is heated at a temperature of 200° C. or higher. Futher, the adhesion between these materials has a relatively low resistance against oils at an elevated temperature so that a phenomenon of peeling or sep-aration sometimes takes place at the interface of adhesion when an adhesively bonded composite body is dipped in an oil at a high temperature.

Accordingly, a proposal has been made in Japanese Patent Publication No. 56-39817 for an improved primer composition of this type having a rubber cement-like consistency as composed of a vinyl-containing organopolysiloxane, an organopolysiloxane resin, an alkoxysilane, an organic peroxide and a catalyst. Although this primer composition is effective to improve the adhesive bonding strength at a high temperature in a dry condition or in an oil, the preparation thereof is performed disadvantageously taking a great deal of time and labor due to the complicated formulation thereof. Further, when the primer composition is applied to the injection molding of a silicone rubber compound, the primer layer may be partly or wholly peeled away by the flow of the rubber compound. In addition, certain troublesomeness is unavoidable in the practical use of the primer composition of this type due to the poor air-dryability and the excessive flowability which necessitates preheating of the primer layer to ensure evenness of the primer coating.

SUMMARY OF THE INVENTION

It is therefore an object of the present invention to provide a novel method for surface priming free from the above described problems in the prior art methods in the adhesive bonding of a silicone rubber composition on to the surface of a metal or a plastic resin by use of an organosilicon compound which hitherto has never been used as a primer material.

Thus, the method of the present invention for surface priming in the adhesive bonding of a silicone rubber composition on to the surface of a metal or plastic body comprises coating the surface of the metal or plastic body with an organosilicon compound defined below as a priming material prior to bonding with the silicone rubber compound.

The organosilicon compound used as the priming material in the inventive method or the principal ingredient in a primer composition used in the inventive method is a silazane linkage-containing organosilicon polymer represented by the average unit formula

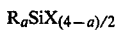

$$R_a SiX_{(4-a)/2}$$

in which R is a hydrogen atom or a monovalent hydrocarbon group, X is a divalent atom or group selected from the class consisting of an oxygen atom —O—, an imino group —NH—, alkylene groups having 1 to 6 carbon atoms and a phenylene group and a is a positive number in the range from 0.2 to 1.8, at least one of the monovalent hydrocarbon groups denoted by R in a molecule being an aliphatically unsaturated group and at least 10% by moles of the atoms and groups denoted by X being imino groups.

DETAILED DESCRIPTION OF THE PREFERRED EMBODIMENTS

The above described method of the present invention has been completed as a result of the extensive investigations undertaken by the inventors with an object to obtain a primer composition with which excellent adhesive bonding strength can be obtained even at a high temperature either in a dry condition or in an oil, leading to the discovery that the above described specific organosilicon polymer having silazane linkages is quite satisfactory for the purpose as the principal ingredient of the primer composition along with the advantages that this polymer can be prepared inexpensively in a relatively simple process with easiness of quality control to give products of constant quality. In addition to the above mentioned heat resistance of the adhesive bonding obtained by use of the compound as the primer, the primer composition used in the inventive method is advantageous in the good air-dryability so that the coating film of the composition is imparted with sufficient strength by merely keeping for a relatively short time without the danger of peeling by the flow of the rubber compound to be adhesively bonded to the primed surface. Therefore, the method of the present invention using the above described primer composition is useful in and applicable to the injection molding, transfer molding and the like shaping methods in which the primed surface may sometimes be under a strong shearing force.

The silazane linkage-containing organosilicon polymer as the principal ingredient in the primer composition used in the inventive method is represented by the above given average unit formula (I), in which R is a hydrogen atom or a substituted or unsubstituted monovalent hydrocarbon group selected from the class consisting of alkyl groups such as methyl, ethyl, propyl and butyl groups, alkenyl groups such as vinyl and allyl groups, aryl groups such as phenyl and tolyl groups and cycloalkyl groups such as cyclohexyl group as well as those substituted groups obtained by the replacement of a part or all of the hydrogen atoms in the above named hydrocarbon groups with substituent atoms or groups such as halogen atoms, cyano groups and the like exemplified by chloromethyl, 3,3,3-trifluoropropyl and cyanomethyl groups. It is essential that at least one of the groups denoted by R in a molecule should be an aliphatically unsaturated group such as, preferably, vinyl, allyl and 3-methacryloxypropyl groups. The symbol X in the formula (I) denotes a divalent atom or group selected from the class consisting of an oxygen atom —O—, an imino group —NH—, alkylene groups having 1 to 6 carbon atoms and a phenylene group and at least 10% by moles of the groups denoted by X in a molecule should be imino groups. The suffix a is a positive number in the range from 0.2 to 1.8.

Particular examples of suitable silazane linkage-containing organosilicon polymer include the compounds composed of the units expressed by the following unit formulas, in which the symbols Vi, Me, Et, Ph and Phn each denote a vinyl, methyl, ethyl, phenyl and 1,4-phenylene group, respectively:

ViSi(NH)$_{1.5}$; CH$_2$=CMe—CO—O—CH$_2$$_3$Si(NH)$_{1.5}$; Vi—CH$_2$Si(NH)$_{1.5}$;
(NH)$_{1.5}$SiCH$_2$CH$_2$SiMeVi—O—SiMeVi—CH$_2$CH$_2$Si(NH)$_{1.5}$;
(NH)$_{0.5}$—SiMeVi—Phn—SiMeVi—(NH)$_{0.5}$;

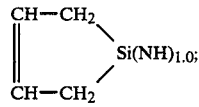

HSi(NH)$_{1.5}$ and Vi—Phn—Si(NH)$_{1.5}$.

It is of course that these units may form a part of a copolymeric organosilicon polymer with the units having no aliphatic unsaturation expressed by the formulas:

MeSi(NH)$_{1.5}$; Me$_2$Si(NH); PhSi(NH)$_{1.5}$; EtSi(NH)$_{1.5}$;
Ph—CH$_2$CH$_2$Si(NH)$_{1.5}$; CF$_3$CH$_2$CH$_2$Si(NH)$_{1.5}$ and HSi(NH)$_{1.5}$.

The above described silazane linkage-containing organosilicon polymers can readily be synthesized by the reaction of ammonia or a primary amine with a corresponding chlorosilane, a silicone polymer having hydrolyzable chlorine atoms or a mixture thereof. The reaction proceeds, for example, according to the following reaction equations, in which R has the same meaning as defined above and n is a positive number of 1, 2 or 3, to form an organosilicon polymer having silazane linkages:

R$_n$SiCl$_{4-n}$+(4—n)NH$_3$→R$_n$Si(NH$_2$)$_{4-n}$+(4—n)NH$_4$Cl; and R$_n$Si(NH$_2$)$_{4-n}$→R$_n$SiNH$_{4-n/2}$.

The chlorosilanes and hydrolyzable chlorine-containing organosilicon polymers which can pertain to the above described reactions are exemplified by the compounds expressed by the following general formulas, in which R has the same meaning as defined above, Me is a methyl group, Phn is a 1,4-phenylene group and m is a positive integer:

RSiCl$_3$; R$_2$SiCl$_2$; R$_3$SiCl; Cl—SiR$_2$—O—SiR$_2$$_m$Cl; Cl$_3$SiCH$_2$CH$_2$—SiR$_2$—O—SiR$_2$—CH$_2$CH$_2$SiCl$_3$; Cl—SiR$_2$—Phn—SiR$_2$—Cl; and RSi(OMe)Cl$_2$.

It should be noted that at least one of the groups denoted by R in a molecule of these organosilicon compounds should be an aliphatically unsaturated group in view of the requirement that the resultant silazane linkage-containing organosilicon polymer should have such an unsaturation. When none of the groups denoted by R in these organosilicon compounds is aliphatically unsaturated, however, an aliphatically unsaturated group can be introduced by the copolymerization of these organosilicon compounds with other chlorine- and unsaturation-containing organosilicon compounds expressed, for example, by the following formulas:

ViSiMeCl$_2$; Vi—CH$_2$SiCl$_3$;

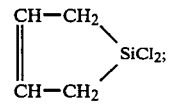

CH$_2$=CMe—CO—O—CH$_2$CH$_2$CH$_2$SiCl$_3$; Vi—Ph-n—SiCl$_3$; and Vi—Phn—CH$_2$—NH—CH$_2$CH$_2$CH$_2$SiCl$_3$, followed by the reaction with ammonia or a primary amine.

The terminal group at each of the molecular chain ends of the organosilicon polymer is usually a silylamine group —SiNH$_2$ but it may be a hydroxy group, alkoxy group, oxime group and the like bonded to the terminal silicon atom with no particularly adverse influence on the performance of the organosilicon polymer as the principal ingredient of the primer composition used in the inventive method.

The silazane linkage in the organosilicon polymer can readily be hydrolyzed even at room temperature by the atmospheric moisture contained in the air to be converted into a silanolic hydroxy, from which a siloxane linkage is formed by the dehydration condensation reaction. In order that the surface film of the primer composition can be cured by the formation of the siloxane linkages mentioned above, it is preferable that the number of the monovalent hydrocarbon groups bonded to the silicon atoms in a molecule of the organosilicon polymer does not exceed 1.8 on an average or in the range from 0.2 to 1.8 or, more preferably, from 0.8 to 1.5 per atom of silicon.

The primer composition used in the inventive method is prepared by dissolving the above described silazane linkage-prepared containing organosilicon con polymer in a suitable organic solvent in a concentration of, for example, from 0.1 to 10% by weight although the concentration can be higher according to need. The organic solvent is not particularly limitative and usable ones include hydrocarbon solvents such as toluene, xylene, petroleum ether and the like, chlorinated hydrocarbon solvents such as methylene chloride, trichloroethylene and the like, ethers such as diethyl ether and the like, esters such as ethyl acetate and the like, ketones such as methyl ethyl ketone and the like and low-molecular siloxane compounds such as hexamethyl disiloxane, oligomeric cyclic siloxanes of dimethyl-siloxane units and the like.

The primer composition used in the inventive method, which is an organic solution of the silazane linkage-containing organosilicon polymer in an organic solvent named above, can form a primer layer when it is applied to a substrate surface and air-dried. It is, however, optional that the primer composition is admixed according to need with a catalyst such as an alkyl titanate, organic tin compound, amine compound and the like. As is mentioned before, the silazane linkage-containing organosilicon polymer can form a cured surface film even at room temperature when kept in contact with moisture-containing air but curing of the organosilicon polymer can be accelerated by heating. The cured surface film of the organosilicon polymer obtained by air-drying or by heating can exhibit excellent priming effect on a variety of substrate materials such as metals, plastic resins, rubbers, ceramics and others. The inventive method is, however, particularly advantageously applicable when adhesive bonding of a silicone rubber on to the surface of the above named substrate materials is intended. Suggested applications of the inventive method include, for example, the adhesive bonding of a metal-made mandrel and outer rubber layer in various kinds of rubber rollers such as an upper and a lower fuser roller in xerographic copying machines and laminating roller in plastic fabrication, adhesive bonding in the manufacture of composite oil seals and gaskets for automobiles and adhesive bonding in the manufacture of various kinds of sheets and belts.

Although not particularly limitative, the silicone rubber composition to which the inventive method is most advantageously applicable is one of those of the type curable with an organic peroxide as a curing agent or by the addition reaction for crosslink formation. The inventive method is of course applicable to the adhesive bonding of a room temperature curable silicone rubber composition by the mechanism of the condensation reaction depending on the nature of the substrate surface. The effectiveness of the inventive method is not limited to the adhesive bonding of silicone rubbers but also to the adhesive bonding of other types of rubbers such as urethane-based rubbers and polysulfide rubbers. Hydrolysis of the primer composition produces silanol groups and silylamine groups having extremely high activity and the effect of the active hydrogen atoms in the remaining silazane linkages can also be expected so that the application fields of the inventive method are very wide with high reliability in comparison with the prior art methods of priming with conventional primer compositions. In addition to the ordinary manner of use as a principal ingredient in a primer composition, the silazane linkage-containing organosilicon polymer is also useful as an additive in a rubber composition to impart the rubber composition with self-adhesiveness. The primer composition used in the inventive method is also useful as an undercoating material for a conventional primer composition so as to increase the priming effect of the conventional primer composition.

In the following, the method of the present invention is described in more detail by way of examples.

EXAMPLE 1

An organosilicon polymer composed of the units expressed by the formula $ViSi(NH)_{1.5}$ was dissolved in methylene chloride in a concentration of 5% by weight to give a solution, which is referred to as Primer Solution I hereinbelow. A test panel of aluminum of the grade A-1050P specified in JIS H 4000 was coated with the thus prepared Primer Solution I followed by air-drying at room temperature for 30 minutes and then a silicone rubber composition (KE 555U, a product by Shin-Etsu Chemical Co.) admixed with 0.6% by weight of dicumyl peroxide was spread on the thus treated surface of the test panel in a thickness of 2 mm and cured thereon at a temperature of 165° C. under a pressure of 30 kg/cm² for 10 minutes to be adhesively bonded thereto.

In the above described procedure of test bonding of the silicone rubber composition to the aluminum surface, records were made of the air dryability of the primer solution on the substrate surface, the strength of the dried primer film on the surface, the flowing behavior of the primer composition during the press-bonding of the silicone rubber and the adhesive bonding strength between the aluminum test panel and the silicone rubber as cured. The results were shown in Table 1 below.

For comparison, the same experimental procedure as above was repeated except that the surface treatment of the substrate surface was undertaken with a Primer Solution II prepared by dissolving an organosilicon polymer composed of the units expressed by the formula $MeSi(NH)_{1.5}$ instead of $ViSi(NH)_{1.5}$.

For further comparison, a Primer Solution III was prepared from a methyl vinyl polysiloxane, a silicone resin containing phenyl groups, vinyl tris(2-methoxyethoxy)silane, a fumed silica filler, dicumyl peroxide and tin dilaurate according to the disclosure given in Example 1 of the above recited reference Japanese Patent Publication No. 56-39817 and the same test for the adhesive bonding of the silicone rubber to the aluminum test panel as above was performed with this Primer Solution III. The results of these comparative tests are also shown in Table 1.

In Table 1, the criteria for the evaluation of the air-dryability and the strength of the primer film were as described below.

Air-dryability

Good: no tackiness to the touching finger tip
Fair: slightly sticky to the touching finger tip
Poor: no curing with stickiness to touching finger tip

Strength of primer film

Good: no problem in injection molding
Fair: capable of withstanding compression molding and liquid injection molding in most cases
Poor: primer layer destroyed by rubbing with finger tip Meanwhile, the adhesive bonding strength was determined by pulling and peeling the rubber layer in the 180° direction at a velocity of 50 mm/minute.

The test specimen prepared in the above by use of the Primer Solution I was kept for 20 days in a hot air oven at 250° C. without noticeable decrease in the adhesive bonding strength between the silicone rubber layer and the aluminum subtrate.

TABLE 1

| | Primer Solution | | |
|---|---|---|---|
| | I | II | III |
| Air-dryability | Good | Good | Fair |
| Strength of primer film | Good | Good | Poor |
| Flow of primer film | No | No | Yes |
| Adhesive bonding strength | 21 kgf/25 mm, rubber destroyed | Peeling at the interface between rubber & primer film | 19 kgf/25 mm, rubber destroyed |

Further, the same test specimen was dipped and kept in a dimethyl silicone fluid having a viscosity of 100 centistokes at 25° C. for 14 days at a temperature of 200° C. also without noticeable decrease in the adhesive bonding strength. Thus, it was made apparent that excellent priming effect could be obtained by the inventive method in the adhesive bonding of a silicone rubber and an aluminum test panel to withstand a heat treatment at high temperatures for a long period of time in a dry condition or in an oil.

EXAMPLE 2

An organosilicon polymer composed of 5% by moles of the units expressed by the formula $ViSi(NH)_{1.5}$, 10% by moles of the units expressed by the formula $CH_2=CMe-CO-O-CH_{23}Si(NH)_{1.5}$ and 85% by moles of the units expressed by the formula $MeSi(NH)_{1.5}$ was dissolved in methylene chloride in a concentration of 5% by weight to give a solution, which is referred to as Primer Solution IV hereinbelow, and the priming effect of the Primer Solution IV was examined in the same manner as in the preceding example. The air-dryability of the primer solution was quite satisfactory to be tack-free within 10 minutes after application to the substrate surface. The adhesive bonding strength of the silicone rubber to the aluminum substrate surface as cured was 25 kgf/25 mm by use of the Primer Solution IV and the adhesive bonding strength was decreased to 17 kgf/25 mm when the bonded test specimen was dipped and kept at 200° C. for 12 days in a dimethyl silicone fluid having a viscosity of 100 centistokes at 25° C.

EXAMPLE 3

An organosilicon polymer composed of 7% by moles of the units expressed by the formula $Vi-CH_2Si(NH)_{1.5}$ and 93% by moles of the units expressed by the formula $MeSi(NH)_{1.5}$ was dissolved in methylene chloride in a concentration of 5% by weight to give a solution, which is referred to as Primer Solution V hereinbelow, and the priming effect thereof was examined in the following manner. Thus, the Primer Solution V was applied to the surface of the same test panel of aluminum as used in Example 1 and air-dried for 60 minutes and a silicone rubber composition (KE 555U, supra) admixed with 1% by weight of a platinum catalyst (C-10, a product by Shin-Etsu Chemical Co.) and 2% by weight of a crosslinking agent (C-252P, a product by the same company) was spread in a thickness of 2 mm on to the thus surface-treated aluminum panel and cured by heating at 120° C. for 10 minutes under a pressure of 30 kg/cm². The adhesive bonding strength of the thus cured and bonded silicone rubber layer to the aluminum substrate was quite satisfactory and capable of withstanding a heat treatment at 200° C. in a dry condition or by dipping in a hot demethyl silicone fluid.

EXAMPLE 4

The same test for the priming effect as in Example 1 was undertaken for 4 different primer solutions VI to IX prepared by dissolving the following organosilicon polymers VI to IX, respectively, in methylene chloride.

Organosilicon Polymers

VI: an organosilicon polymer composed of 5% by moles of the units expressed by the formula $CH_2=CMe-CO-O-CH_2Si(NH)_{1.5}$ and 95% by moles of the units expressed by the formula $MeSi(NH)_{1.5}$ VII: an organosilicon polymer composed of 10% by moles of the units expressed by the formula $Vi-Si(NH)_{1.5}$ and 90% by moles of the units expressed by the formula $Me_2Si(NH)$ VIII: an organosilicon polymer composed of 15% by moles of the units expressed by the formula $(NH)_{1.5}SiCH_2CH_2-SiViMe-O-SiViMe-CH_2CH_2Si(NH)_{1.5}$ and 85% by moles of the units expressed by the formula $MeSi(NH)_{1.5}$ IX: an organosilicon polymer composed of 33% by moles of the units expressed by the formula $(NH)_{0.5}-SiViMe-(Phn)-SiViMe-(NH)_{0.5}$, in which (Phn) is a 1,4-phenylene group, and 67% by moles of the units expressed by the formula $MeSi(NH)_{1.5}$.

The results of the test were that each of the Primer Solutions VI to IX was quite satisfactory in respect of the air-dryability, strength of the primer film, flowing behavior in the press-bonding of the silicone rubber composition and adhesive bonding strength of the silicone rubber to the substrate surface as well as retention thereof after the heat treatment in a dry condition or by dipping in a hot dimethyl silicone fluid.

EXAMPLE 5

An aluminum mandrel having a diameter of 30 mm and a length of 300 mm was coated with the Primer Solution I prepared in Example 1 followed by air-drying for 30 minutes. A rubber roll for a xerographic copying machine was prepared using this surface-treated aluminum mandrel by coating the same with the same silicone rubber composition as used in Example 1 in a thickness of 2 mm by the method of injection. In this case, absolutely no flowing was noted in the primer layer and the adhesive bonding strength between the aluminum mandrel and the silicone rubber layer after curing was quite satisfactory.

What is claimed is:

1. A method for surface priming in adhesively bonding a silicone rubber composition to the surface of a substrate which comprises treating the surface of the substrate with an organosilicon polymer having a silazane linkage in the molecule and represented by the average unit formula $$R_aSiX_{(4-a)/2}$$

in which R is a hydrogen atom or a monovalent hydrocarbon group, not all of the atoms and groups denoted by R in a molecule being hydrogen atoms, X is a divalent atom or group selectd from the class consisting of an oxygen atom, an imino group, alkylene groups having 1 to 6 carbon atoms and a phenlyene group and a is a positive number in the range from 0.2 to 1.8, at least one of the atoms and groups denoted by R in a molecule being an aliphatically unsaturated hydrocarbon group and at least 10% by moles of the atoms and groups denoted by X in a molecule being imino groups, and then contacting the treated surface with an unvulcanized silicone rubber composition and subjecting the composite thus formed to conditions to cure the composition.

2. The method as claimed in claim 1 wherein the aliphatically unsaturated group denoted by R is selected from the class consisting of vinyl, allyl and 3-methacryloxypropyl groups.

* * * * *